United States Patent
Li et al.

(10) Patent No.: US 10,885,095 B2
(45) Date of Patent: Jan. 5, 2021

(54) PERSONALIZED CRITERIA-BASED MEDIA ORGANIZATION

(71) Applicant: Yahoo Holdings, Inc., Sunnyvale, CA (US)

(72) Inventors: Jia Li, Santa Clara, CA (US); Joseph Kaye, Mountain View, CA (US)

(73) Assignee: Verizon Media Inc., New York, NY (US)

(*) Notice: Subject to any disclaimer, the term of this patent is extended or adjusted under 35 U.S.C. 154(b) by 297 days.

(21) Appl. No.: 14/215,279

(22) Filed: Mar. 17, 2014

(65) Prior Publication Data

US 2015/0261752 A1 Sep. 17, 2015

(51) Int. Cl.
*G06F 16/48* (2019.01)

(52) U.S. Cl.
CPC .................................. *G06F 16/48* (2019.01)

(58) Field of Classification Search
CPC ........... G06F 17/30; G06F 3/048; G06F 17/00
USPC .................. 707/767, 748, 732; 715/810, 255
See application file for complete search history.

(56) References Cited

U.S. PATENT DOCUMENTS

| | | | | |
|---|---|---|---|---|
| 7,916,976 B1* | 3/2011 | Kedikian | ............... | G06F 16/50 382/305 |
| 8,913,152 B1* | 12/2014 | Carceroni | .......... | H04N 5/23293 348/222.1 |
| 2006/0218187 A1* | 9/2006 | Plastina | ............ | G06F 17/30029 |
| 2007/0077025 A1* | 4/2007 | Mino | ................ | G06F 17/30256 386/241 |
| 2007/0288453 A1* | 12/2007 | Podilchuk | ......... | G06F 17/30259 |
| 2008/0021921 A1* | 1/2008 | Horn | .................... | G06F 17/3002 707/999.102 |
| 2011/0235858 A1* | 9/2011 | Hanson | ............... | G06F 17/3028 382/103 |
| 2011/0307491 A1* | 12/2011 | Fisk | .................. | G06F 17/30056 707/741 |
| 2013/0054620 A1* | 2/2013 | Stokes | ................ | G06F 17/3028 707/749 |
| 2013/0061135 A1* | 3/2013 | Reinders | ........... | G06F 17/30867 715/255 |
| 2013/0156275 A1* | 6/2013 | Amacker | .......... | G06F 17/30277 382/118 |
| 2014/0067349 A1* | 3/2014 | Oka | .................... | G06F 17/3028 703/6 |
| 2014/0079324 A1* | 3/2014 | Ishige | ..................... | G06F 16/50 382/224 |
| 2014/0149376 A1* | 5/2014 | Kutaragi | ........... | G06F 17/30259 707/706 |

(Continued)

*Primary Examiner* — Alicia M Antoine
(74) *Attorney, Agent, or Firm* — Pillsbury Winthrop Shaw Pittman LLP

(57) ABSTRACT

Personalized criteria-based media organization is provided. Digital media items are organized into one or more albums. At least one album is associated with album membership criteria and includes only digital media items that satisfy the album membership criteria. An album is updated by receiving user input identifying at least one criteria creation element, generating user-defined album membership criteria based on the at least one criteria creation element, identifying any matching digital media items that satisfy the user-defined album membership criteria, and associating the matching digital media items with the album.

20 Claims, 10 Drawing Sheets
(2 of 10 Drawing Sheet(s) Filed in Color)

(56) References Cited

U.S. PATENT DOCUMENTS

| | | | |
|---|---|---|---|
| 2014/0181157 A1* | 6/2014 | Houston | G06F 17/30312 707/812 |
| 2014/0289323 A1* | 9/2014 | Kutaragi | G06F 17/30047 709/203 |
| 2015/0039607 A1* | 2/2015 | Lothian | G06F 17/3053 707/732 |
| 2015/0131872 A1* | 5/2015 | Ganong | G06K 9/00677 382/118 |
| 2015/0143236 A1* | 5/2015 | Tena Rodriguez | G06F 17/212 715/273 |
| 2015/0235110 A1* | 8/2015 | Curtis | G06K 9/00677 382/224 |

* cited by examiner

PERSONALIZED CRITERIA-BASED MEDIA ORGANIZATION

FIELD OF THE INVENTION

The present invention relates to digital media storage, organization and retrieval.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users are taking a growing number of digital photos, as well as generating a growing number of other forms of digital media (e.g. video, audio recordings, etc.). Media content is easily generated due to the prevalence of media capture devices on mobile devices. Many photo sharing services allow the automatic upload of digital photographs. With the growing size of personal photo repositories, manual categorization and search schemes are inadequate to allow users to organize and retrieve their personal digital media.

Rudimentary photo classification is used to group all photos in an account. For example, in iPhoto®, predefined rules allow all the photos in an account to be grouped by a time range, by timeline, by faces, or by location. These rudimentary classification methods are not flexible because they are hard-coded into the application and applied to the entire set of digital photographs in an account. Furthermore, they do not allow more complex or personalized categorization and organization of photos.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee. In the drawings.

DETAILED DESCRIPTION

Figure 1:
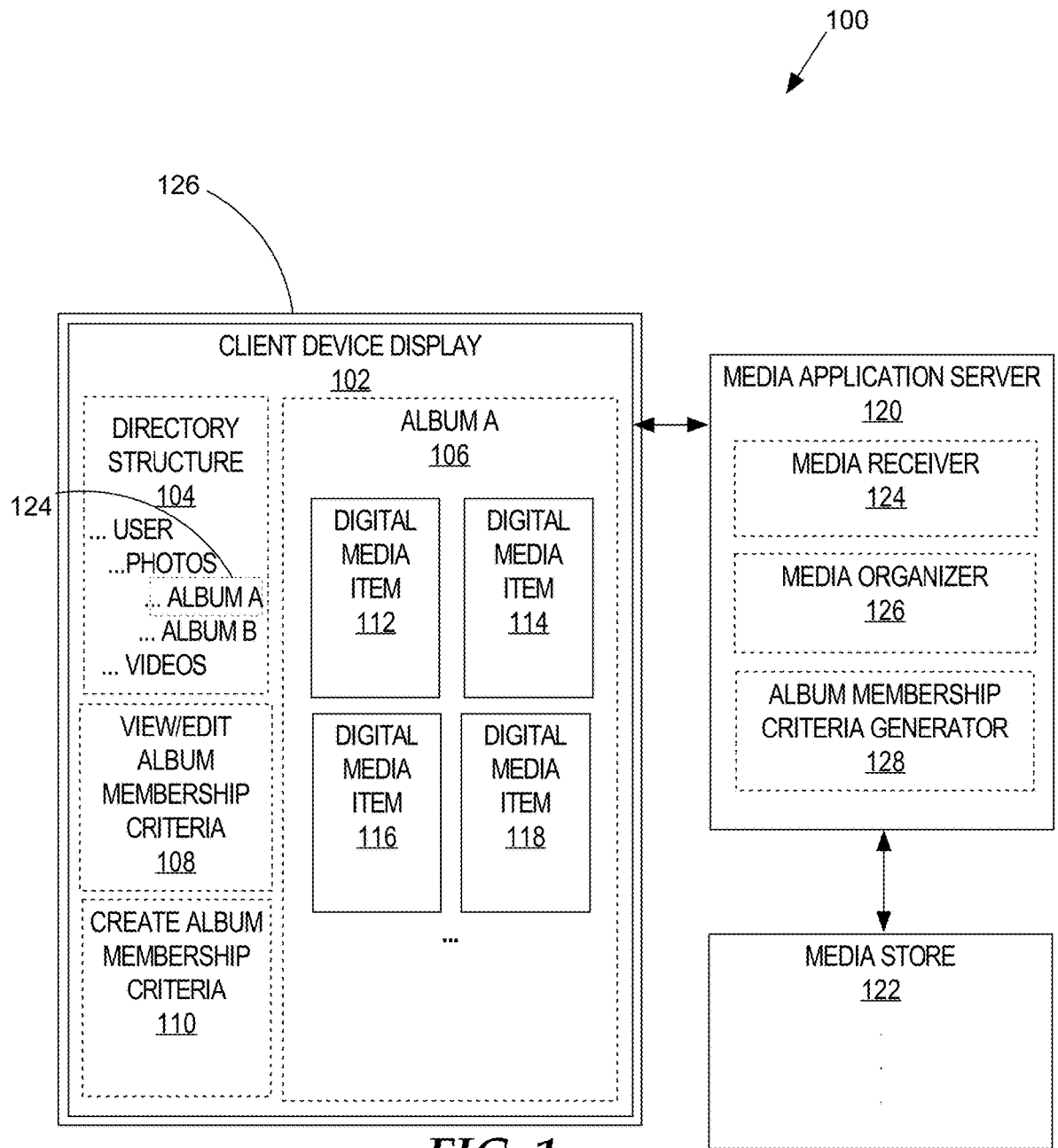
FIG. 1 illustrates an embodiment of a system for personalized criteria-based media organization.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Personalized criteria-based media organization and retrieval is provided. Users can flexibly define criteria for automatically organizing and retrieving personal digital media into albums, including digital media items such as audio data, image data, three-dimensional data, video data, and multimedia data. The criteria used to establish groups of media are referred to herein as "album membership criteria." Rather than being hardcoded, the album membership criteria are generated based on user input that identifies one or more criteria creation elements. When a digital media item satisfies the user-defined album membership criteria for a particular album, the digital media item is automatically established as a member of the album.

The user input may identify different types of criteria creation elements. In one embodiment, the user may establish the membership criteria for an album to be "all media that includes a depiction of X", where X is a particular object. The object may be a "non-human" object, such as a football, a car, or a building. In response, the membership of that album is automatically established to be all digital media items that include a depiction of that particular object.

Instead of or in addition to specifying a particular object, a user may specify a person. In response to the user-specified person, an album membership criterion is generated that is satisfied by digital media items that include a depiction of the specified person.

When the user input identifies a specified time value, an album membership criterion is generated that is satisfied by digital media items that are associated with the specified time value. When the user input identifies a specified location, an album membership criterion is generated that is satisfied by digital media items that are associated with the specified location value. When the user input identifies other specified metadata attribute values, an album membership criterion is generated that is satisfied by digital media items that are associated with the specified metadata value. Time values, location values and other metadata attribute values are described in greater detail herein.

These are merely examples of types of album membership criteria that may be specified by a user. Further, for a single album, various types of criteria can be combined in an arbitrarily complex way. For example, the criteria for one album may be "all media that includes a depiction of a football and a depiction of (Fred or Sam) that was created in Europe using digital camera X, during the month of June, 2013".

In one embodiment, the user input identifies at least one exemplar media item. For example, the user input may select one or more digital photos. The user input may alternatively identify an album containing digital media items to be used as the exemplar media items. Once the exemplar item(s) are identified, the system automatically determines at least one common characteristic of the exemplar media items. One or more album membership criteria are generated based on the common characteristic/s. For example, the common characteristics may include depicting an object, depicting a person, being associated a time value, being associated with a location value, being associated with another metadata value, having a data feature extracted by data processing, having an image feature extracted by image processing, or any other common characteristic.

The album membership criteria associated with an album may be modified, such as through additional user input, training, and/or by modifying a criteria expression corresponding to the album membership criteria. A criteria expression includes at least one album membership criteria coupled with one or more logical operators. In one embodiment, album membership criteria for one or more albums may be automatically detected and/or suggested to a user based on prior user behavior.

The album membership criteria are used to automatically organize existing media and/or to organize newly uploaded media. Album membership criteria may also be used as search criteria. For example, search criteria, similar to album membership criteria, can be specified and used to search for and/or otherwise retrieve media that satisfies the search criteria.

Criteria-Based Media Organization System

FIG. 1 illustrates an embodiment of a system for personalized criteria-based media organization. Criteria-based media organization system 100 includes media application server 120. Media application server 120 is configured to store and organize digital media items for one or more users. The digital media items may include audio data, image data, three-dimensional data, video data, multimedia data and/or other digital media data. In one embodiment, the digital media items are stored in one or more media store 122 local to or accessible by media application server 120.

Media application server 120 is configured to provide the digital media items to one or more client computing devices, such as client device 126. In one embodiment, client device 126 is configured to access digital media items associated with an account.

One or more digital media items associated with the account are automatically organized into an album based on personalized album membership criteria. Album membership criteria associated with a specific album are used to determine which digital media items are associated with the album. Digital media items 112-118 are associated with a specific album, ALBUM A 106, based on album membership criteria for ALBUM A 106.

The association between digital media items 112-118 and one or more corresponding albums is managed by media application server 120. In one embodiment, a digital media item can be associated with multiple albums. Digital media items 112-118 associated with a particular album 106 may be presented in a folder 124 belonging to a directory structure 104. The directory structure 104 may be emulated for client device 126 by media application server 120, which may store digital media items 112-118 and their association with ALBUM A 106 in any manner, including but not limited to directory structure 104.

In one embodiment, client device 126 is configured to capture one or more new digital media items using one or more digital media recording devices, such as an imaging device, and an audio recording device, a scanning device, or any combination thereof. Client device 126 is configured to upload the new digital media items to media application server 120. Media application server 120 is configured to automatically organize the new digital media items into one or more albums based on personalized album membership criteria for one or more albums.

A user may view and/or edit album membership criteria, such as via control 108. A user may also create album membership criteria for one or more albums, such as via control 110. Viewing, editing and creating album membership criteria is described in greater detail hereafter.

In one embodiment, media application server includes media receiver 124. Media receiver 124 is configured to receive a plurality of digital media items.

In one embodiment, media application server includes media organizer 126. Media organizer 126 is configured to organize digital media items into one or more albums, where at least one album is associated with album membership criteria and includes only digital media items that satisfy the album membership criteria.

In one embodiment, media application server includes album membership criteria generator 128. Album membership criteria generator 128 is configured to receive user input identifying at least one criteria creation element, generate user-defined album membership criteria based on the at least one criteria creation element, identify any matching digital media items that satisfy the user-defined album membership criteria, and associate the matching digital media items with the album. In one embodiment, the album membership criteria generator is further configured to generate user-defined album membership criteria wherein one criterion is that digital media items in the album include a depiction of the object.

Album Membership Criteria

Users can flexibly define personalized criteria for organizing and/or retrieving their digital media, such as digital media associated with an account. In one embodiment, users define personalized criteria regarding album membership. When a digital media item satisfies the album membership criteria for a particular album, the digital media item is associated with the album. Examples of album membership criteria include but are not limited to:

includes a depiction of a specific object;
includes a depiction of a face associated with a specific person;
is associated with a specific time value;
is associated with a specific location value;
is associated with a specific metadata attribute value;
has a specific data feature; and
has a specific image feature.

In one embodiment, each album membership criterion may function as a boolean expression that evaluates to true or false when applied to a particular media item. The media item is only associated with the corresponding album if the boolean expression evaluates to true for each album membership criterion for the album.

A criteria expression includes one or more album membership criteria coupled with one or more logical operators. In one embodiment, an album is associated with one or more criteria expressions, and a media item is only associated with the corresponding album if the criteria expressions evaluate to true when applied to the media item. Criteria expressions are described in greater detail hereafter.

An album membership criterion is applied to a particular media item by evaluating the media item. For example, media item metadata may be evaluated to determine whether the bum membership criteria are satisfied. Alternatively and/or in addition, the media item may be processed to determine whether the album membership criteria are satisfied. For example, image processing may be performed on the media item to determine whether the media item includes a depiction of a specific object, includes a depiction of a face associated with a specific person, has a specific data feature, or has a specific image feature. In one embodiment, the one or more computational techniques may be tailored based on the expected size of a user's digital media library and/or the expected type of digital media.

Criteria Creation Elements

Album membership criteria can be generated based on criteria creation elements including but not limited to:
 a specified object;
 a specified person;
 specified time data;
 specified location data;
 a specified metadata attribute value; and
 exemplar media item/s,
 including any combination thereof.

Figure 2:
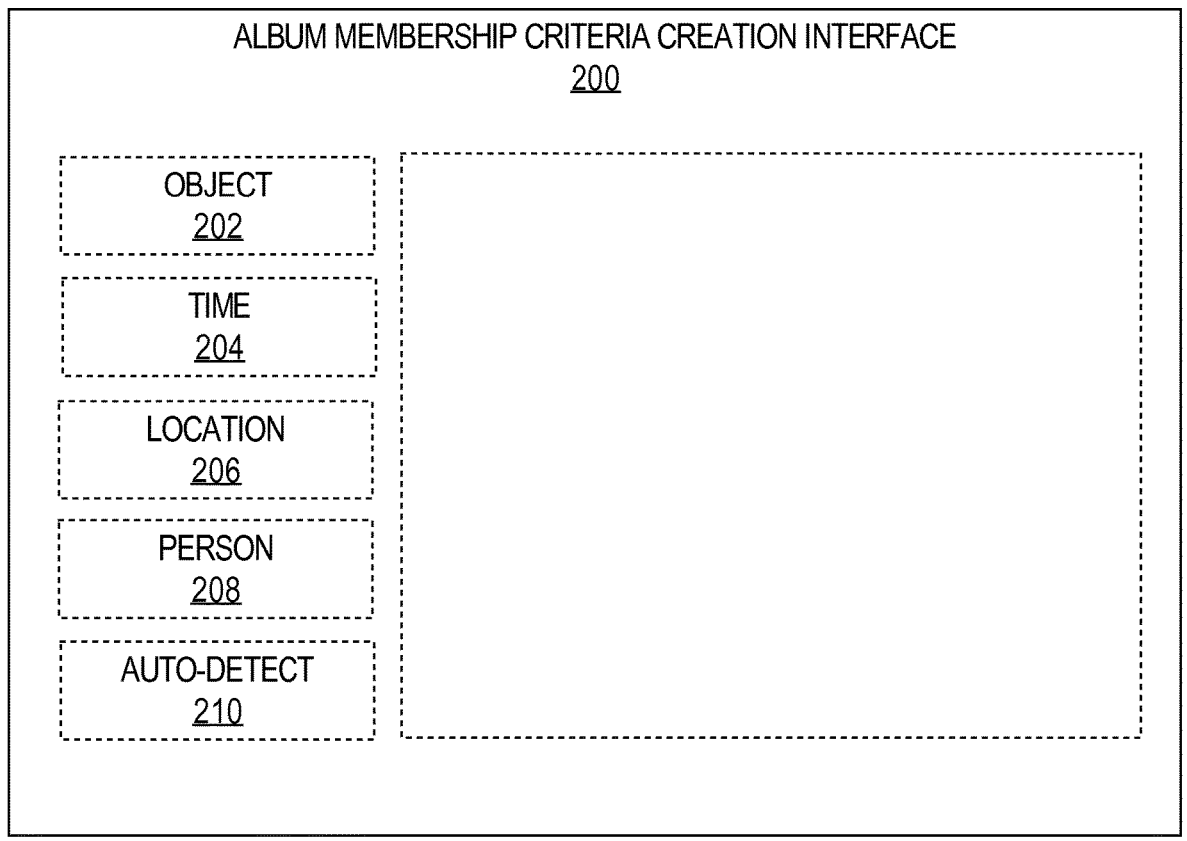
FIG. 2 illustrates an embodiment of an album membership criteria creation interface.

In one embodiment, user-defined album membership criteria are generated for one or more specified albums based on one or more criteria creation elements identified by user input. FIG. 2 illustrates an embodiment of an album membership criteria creation interface. Album membership criteria creation interface 200 includes one or more controls 202-210 for accepting user input that identifies one or more criteria creation elements.

Object control 202 is configured to obtain user input identifying an object as a criteria creation element. Time control 204 is configured to obtain user input identifying time data as a criteria creation element. Location control 206 is configured to obtain user input identifying location data as a criteria creation element. Person control 208 is configured to obtain user input identifying a person as a criteria creation element. Auto-detect control 210 is configured to obtain user input identifying one or more exemplar media items as a criteria creation element. Additional types of criteria creation elements may be used to generate album membership criteria. The generation of album membership criteria based on these different types of criteria creation elements is described in greater detail hereafter.

Album membership criteria creation interface 200 further includes display area 212. Display area 212 may be configured to display one or more interfaces corresponding to controls 202-210. As shown, Auto-detect control 210 is selected, and display area 212 is displaying an interface similar to selection interface 600, described in greater detail hereafter.

Object as a Criteria Creation Element

Album membership criteria may be generated based on an object. An object is specified as a criteria creation element to generate an album membership criterion. An album membership criterion generated based on an object is satisfied by digital media items that include a depiction of the object.

In one embodiment, a media region depicting the object is processed to determine object features usable to determine if a digital media item includes a depiction of the object. For example, points, boundaries, geometries, colors and other features may be extracted from one or more media regions depicting the object. These extracted features may be used to evaluate digital media items to determine if they satisfy the corresponding album membership criteria.

Figure 3A:
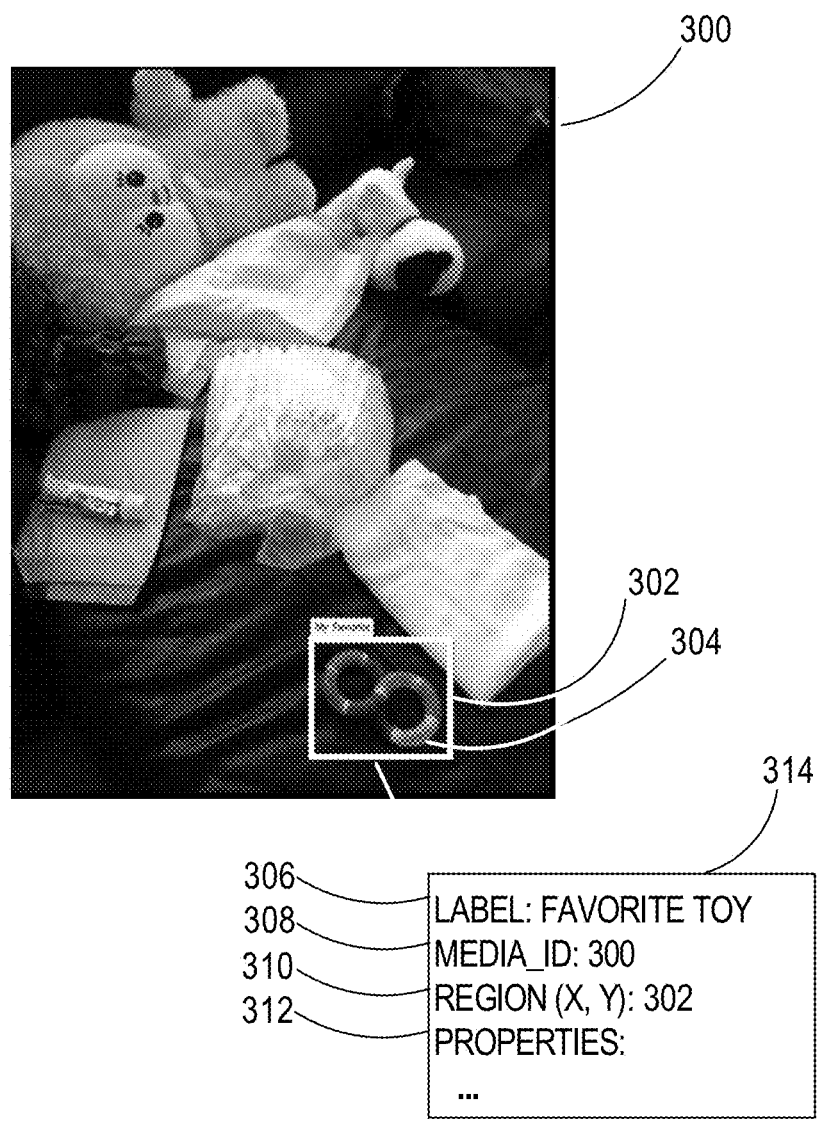
FIG. 3A-3D illustrate an embodiment of an object usable as a criteria creation element.

In one embodiment, a media region depicting the object is selected from an existing digital media item. FIG. 3A illustrates an embodiment of an object usable as a criteria creation element. Digital media item 300 includes a depiction of object 304. Region 302 is a media region of digital media item 300 that includes a depiction of object 304. Region 302 may be selected by a user through an interface displayed after selecting object control 202. In one embodiment, region 302 is a bounding box around the object. One or more features may be extracted from region 302. Features extracted for a particular object may be extracted from multiple media regions of one or more digital media items that include a depiction of the same object. These extracted features are later used to determine if another digital media item includes a depiction of object 304, thereby satisfying album membership criteria generated based on object 304.

Figure 3B:
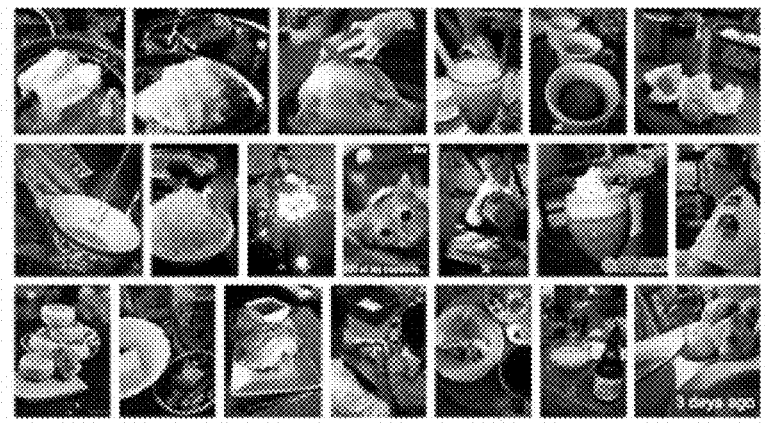

FIG. 3B illustrates actual Google™ image search results returned based on digital media item 300. The image search does not handle the cluttered background of digital media item 300 well, and fails to return visually similar images containing object 304.

Figure 3C:

FIG. 3C illustrates actual Google™ image search results returned based on cropping region 302 of digital media item 300. The image search based on region 302 still does not return visually similar images containing object 304.

Figure 3D:
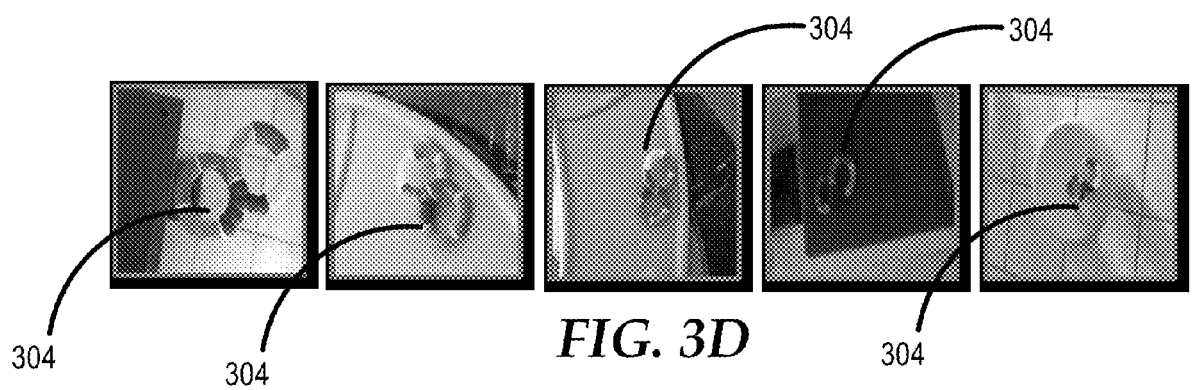

FIG. 3D illustrates actual image search results returned from a personal media repository based on object 304 of region 302. The search based on the extracted features successfully returns digital media items containing object 304.

Object Annotation as a Criteria Creation Element

A media storage and organization system, such as media application server 120, may allow the annotation of a region of the digital media item. For example, one or more regions of a digital image or at least one frame of a digital video may be selected for annotation. Annotation 314 corresponds to region 302 of digital media item 300. Annotation 314 includes one or more fields 306-312. Fields 306-312 may be filled with values describing object 304, including values supplied by a user.

In one embodiment, an annotation and/or the corresponding annotated region of the digital image or a frame of the digital video is used as a criteria creation element to generate one or more album membership criteria. An annotation may be manually selected as a criteria creation element. Alternatively and/or in addition, annotations, including values in fields 306-312, are automatically evaluated to determine criteria creation element candidates. For example, when a user consistently annotates "MY FAVORITE TOY" in their media items, the recurring label and/or the similarity between the corresponding annotated regions may be automatically detected to suggest object 304 as a criteria creation element candidate.

Person as a Criteria Creation Element

Facial recognition in an image or a frame of the digital video is a type of object recognition. Specific algorithms and methods are known in the art for facial recognition. Software, such as iPhoto™, supports photograph organization based on single-face grouping. However, photograph organization based on objects other than faces is not supported. Furthermore, existing software does not allow grouping based on multiple faces, or based on logical operators as described in greater detail hereafter.

In one embodiment, a person is identified as a criteria creation element. When a person is identified as a criteria creation element, an album membership criterion is generated that is satisfied by digital media items that include a depiction of the person. For example, the album membership criteria may be satisfied by digital media items that include a depiction of a face associated with the specified person. Images of the person and/or the person's face are usable to perform image processing and/or extract facial features that are used to determine if other digital media items include a depiction of the person's face. In one embodiment, additional data sources, such as an address book, stored annotations, social media data, or other data sources may be used to obtain one or more images of the person's face based on user input identifying the person.

Time as a Criteria Creation Element

Album membership criteria may be generated based on time data. A time value specified by time data is used as a criteria creation element to generate an album membership criterion. An album membership criterion generated based on the specified time value is satisfied by digital media items associated with the time value. For example, when a digital media item has a time-of-creation timestamp, such as in time metadata, the digital media item satisfies the album membership criterion if the time-of-creation timestamp falls within the specified time value.

Figures 4A, 4B:
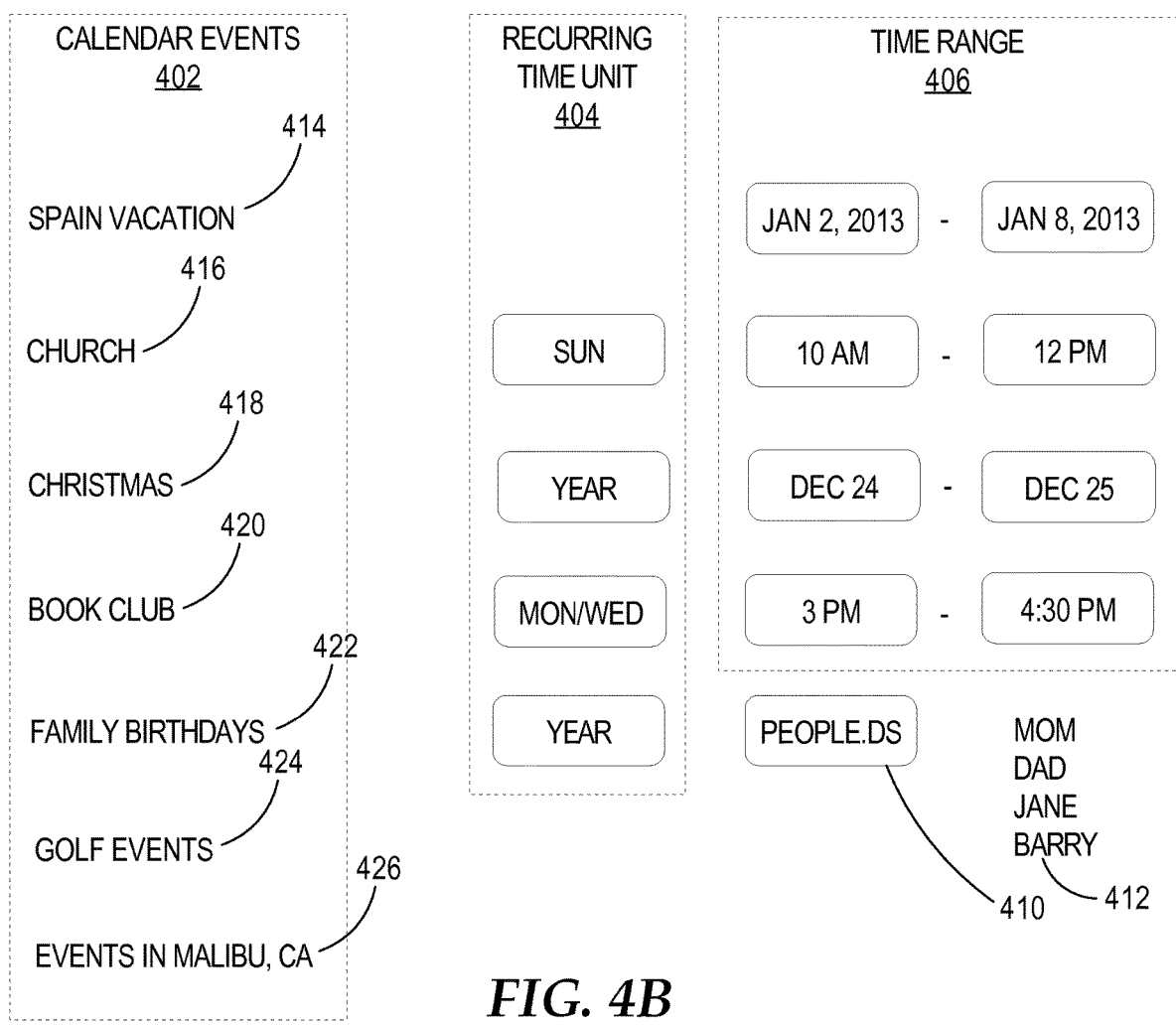
FIG. 4A illustrates an embodiment of a calendar interface.
FIG. 4B illustrates an embodiment of time data for generating album membership criteria.

In one embodiment, a calendar interface is provided for selecting time data, such as calendar interface 400 of FIG. 4A. Calendar interface 400 provides controls for entering time data, such as dates and/or times, including recurring dates and/or times. In one embodiment, calendar interface 400 provides controls for selecting time data comprising one or more calendar events, including recurring calendar events. For example, calendar events stored in association with the same account or a linked user account may be selected using calendar interface 400.

FIG. 4B illustrates an embodiment of time data for generating album membership criteria. As used herein, the term "time data" refers to any time value and/or any object including a reference to one or more time values. For example, time data may be provided as a specified time range 406, a recurring time unit 404, and/or a calendar event 402 associated with one or more specified time ranges 406 and/or recurring times 404.

Calendar events 414-422 are examples of time data that are valid criteria creation elements for generating album membership criteria. When calendar event "SPAIN VACATION" 414 is provided as a criteria creation element, the time value specified by the calendar event (Jan. 2, 2013 to Jan. 8, 2013) is used to generate the corresponding album membership criterion. When recurring calendar event "CHURCH" 416 is provided as a criteria creation element, the time value specified by the calendar event (Sundays from 10 AM to 12 PM) is used to generate the corresponding album membership criterion. When recurring calendar event "CHRISTMAS" 418 is provided as a criteria creation element, the time value specified by the calendar event (every December 24-December 25) is used to generate the corresponding album membership criterion. When recurring calendar event "BOOK CLUB" 420 is provided as a criteria creation element, the time value specified by the calendar event (every Monday and Wednesday from 3 PM to 4:30 PM) is used to generate the corresponding album membership criterion. Alternatively and/or in addition, the recurring time units 404 and/or times 406 associated with calendar events 414-422 may be directly entered as time data without selecting a corresponding calendar event.

In one embodiment, complex calendar events are defined, such as calendar event "FAMILY BIRTHDAYS" 422. As used herein, the term "complex calendar event" refers to calendar events defined by one or more data sources outside of the calendar event. Calendar event 422 includes multiple annually recurring dates corresponding to the birthdays of family members 412. The birthdays of family members 412 may be obtained from an address store, social media data, or another data source 410. The family relationship data may be contained in data source 410 or may be otherwise specified by another data source. When calendar event "FAMILY BIRTHDAYS" 422 is provided as a criteria creation element, the time values specified by the calendar event and the one or more data sources 410 are used to generate the corresponding album membership criterion.

In one embodiment, calendar event properties may be provided as time data. The calendar event properties are then used to determine calendar events that match the calendar event properties. For example, calendar event property "GOLF EVENTS" 424 corresponds to calendar events containing the term "golf" in the title or another portion of the calendar event. When calendar event property "GOLF EVENTS" 424 is provided as a criteria creation element, the time values specified by the matching calendar events are used to generate the corresponding album membership criterion. Calendar event property "EVENTS IN MALIBU, Calif." 426 corresponds to calendar events containing the term "Malibu, Calif." in a location field of the calendar event. When calendar event property "EVENTS IN MALIBU, Calif." 426 is provided as a criteria creation element, the time value specified by the matching calendar events are used to generate the corresponding album membership criterion.

In one embodiment, when a calendar event is selected that includes both time data and location data, both the corresponding time value and the corresponding location value are used as criteria creation elements to generate album membership criteria. Location values are described in greater detail below.

Location as a Criteria Creation Element

Album membership criteria may be generated based on location data. A location value specified by the location data is used as a criteria creation element to generate an album membership criterion. An album membership criterion generated based on location data is satisfied by digital media items associated with the location value. For example, when a digital media item is geo-tagged with a location obtained by a device at the time the digital media item was created, the digital media item satisfies the album membership criterion if its geo-tagged location falls within the specified location value.

Figure 5A:
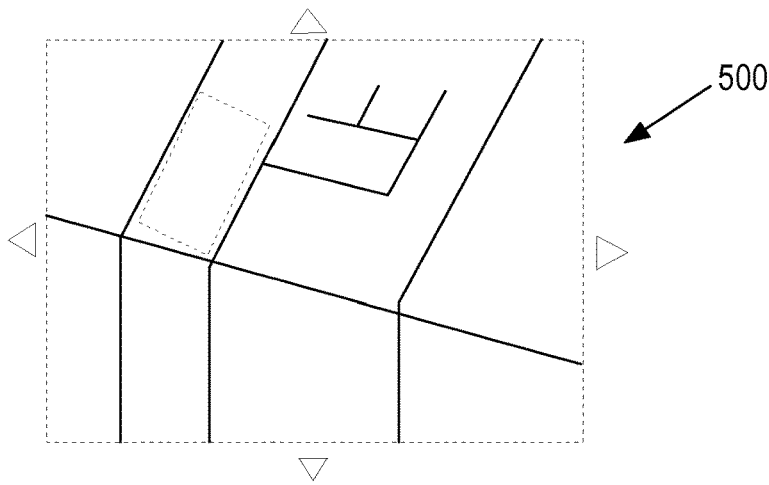
FIG. 5A illustrates an embodiment of a location interface.

In one embodiment, a map interface is provided for selecting one or more location values to associate with an album, such as a map interface 500 of FIG. 5A. map interface 500 provides controls for entering location data, such as addresses, places, geospatial features, points, boundaries, other geometries, and other location metrics.

Figure 5B:
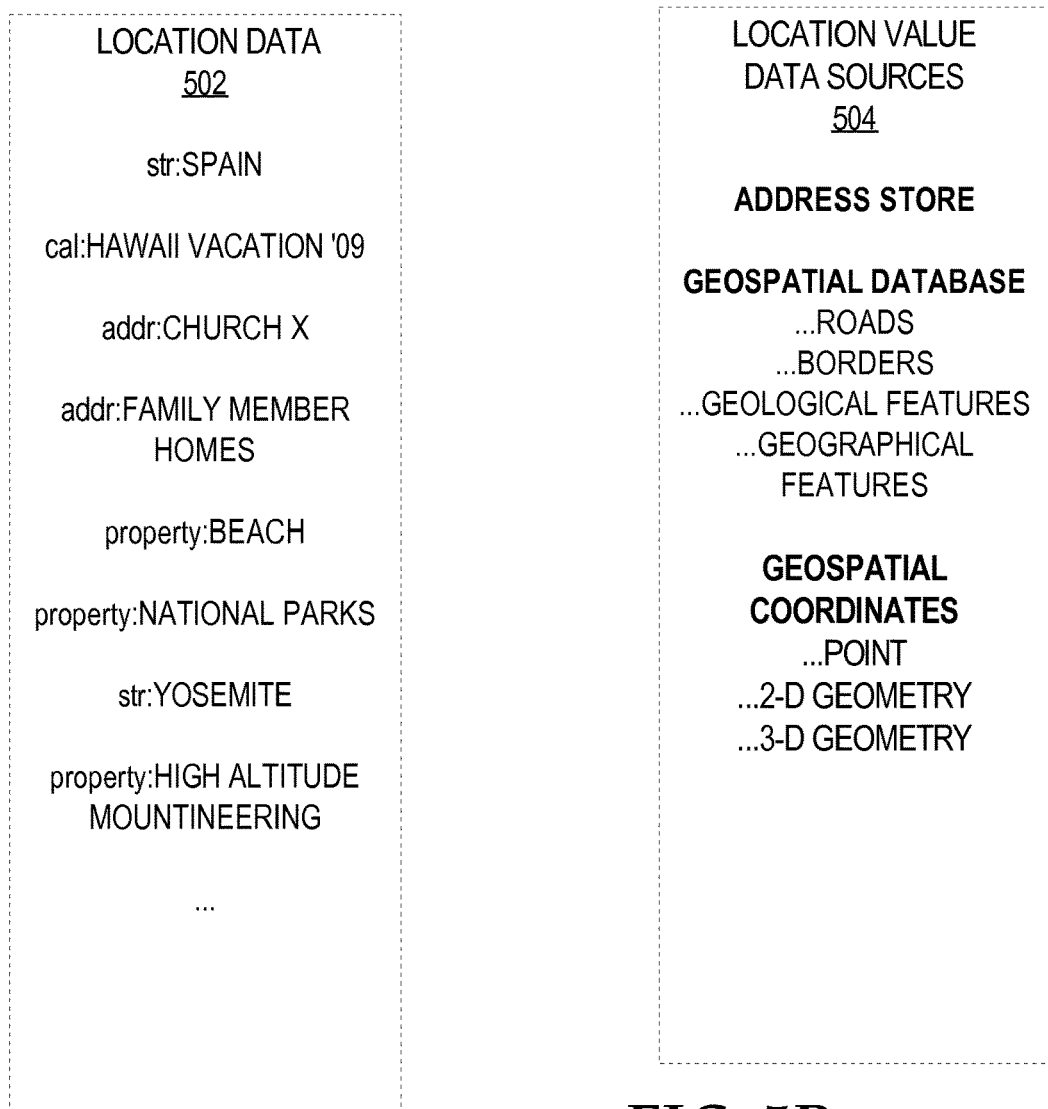
FIG. 5B illustrates an embodiment of location data for generating album membership criteria.

FIG. 5B illustrates an embodiment of location data for generating album membership criteria. As used herein, the term "location data" refers to any location value, location string, and/or any other object, including a reference to one or more location values. In one embodiment, the underlying location value for location data is described as spatial data in a geographic coordinate system. For example, the underlying location value for location data may be described using one or more Global Positioning System (GPS) coordinates.

Location value data sources 504 include one or more data sources configured to store location values and/or objects from which location values can be derived. For example, an address store includes location values for one or more persons and/or businesses. The address store may be a personal address book associated with the account, or another address database. In one embodiment, location values, such as GPS coordinates, may be obtained for each object in the address store.

A geospatial database may include features such as roads, borders, geological features, geographical features, and other geospatial features. A geospatial database may also include one or more addresses. In one embodiment, location values, such as GPS coordinates, may be obtained for each object in the geospatial database.

Location values may also be directly specified using geospatial coordinates, such as GPS coordinates. In one embodiment, a location value is specified using at least one point in a two-dimensional coordinate system (e.g. latitude, longitude) or a three-dimensional coordinate system (e.g. latitude, longitude, altitude). A location value may also be specified using at least one two-dimensional geospatial geometry or a three-dimensional geospatial geometry.

Location data 502 includes examples of location data usable as valid criteria creation elements for generating album membership criteria. The example location data 502 are valid because they include either a location value, a string, or they include a reference to one or more location values. In one embodiment, a string is used in a query on one or more location data sources, event data sources, or other searchable data sources. For example, "SPAIN" is a string corresponding to an object in the geospatial database. When this location data is provided as a criteria creation element, a location value corresponding to the country Spain may be derived and used to generate the corresponding album membership criterion. "HAWAII VACATION '09" is a calendar event that includes location data. The location data of the calendar event acts as a reference to a location value for the state of Hawaii. "CHURCH X" is associated with an address that acts as a reference to a location value for Church X.

In one embodiment, complex location data may be defined, such as location data "FAMILY MEMBER HOMES." As used herein, the term "complex location data" refers to a set of location values defined by data other than location data. "FAMILY MEMBER HOMES" requires the identification of family members and their corresponding addresses from the other data sources.

In one embodiment, generic location properties may be used to refer to multiple geospatial objects and their corresponding location values. For example, the generic location property "BEACH" may refer to any boundary between land and ocean, while the generic location property "NATIONAL PARKS" may refer to boundaries returned in a query for National Parks. Alternatively, a query for the string "YOSEMITE" would return a boundary for one National Park. The generic location property "HIGH ALTITUDE MOUNTINEERING" is an example of a generic location property involving altitude in a three-dimensional coordinate system.

Other Media Metadata

The generation of album membership criteria has been described with respect to time values and location values, including time and location values stored as metadata for one or more digital media items. In one embodiment, album membership criteria are generated based on other metadata attributes. A metadata value for a particular metadata attribute may be directly specified or otherwise extracted from user input. An album membership criterion is generated based on the specified metadata value. An album membership criterion generated based on the specified metadata value is satisfied by digital media items associated with the metadata value.

Exemplar Media Item/s as a Criteria Creation Element

Album membership criteria may be generated based on at least one exemplar media item. At least one common characteristic of the exemplar media items is determined and used to identify similar digital media items that share the same characteristics. The common characteristics may include depicting an object, depicting a person, a time value, a location value, another metadata value, a data feature extracted by data processing, an image feature extracted by image processing, or any other common characteristic of the exemplar media items. One or more album membership criteria are generated based on the common characteristic/s. When only one exemplar media item is selected, the at least one common characteristic may be determined based on characteristics frequently selected by users to generate personalized album membership criteria.

In one embodiment, the exemplar media item/s are processed to determine the common characteristics. For example, common characteristics may be determined based on metadata, such as time metadata, location metadata, other metadata attributes, and tags or other associations, including tags of persons and/or other annotations.

Common characteristics may also be determined by using data processing to extract one or more features from the exemplar media item/s. In one embodiment, image processing is used to extract one or more image features. An image feature may be extracted from an entire image or a portion thereof. Examples of image features include, but are not limited to:
    color moments;
    levels;
    texture;
    brightness;
    contrast;
    histograms;
    gradients; and
    other image processing results, including any combination thereof.

Furthermore, statistical evaluation of any particular image feature, including variance and comparison to threshold values, may be used to determine a common characteristic and/or to determine whether another digital image satisfies album membership criteria generated based on the common characteristic.

Figure 6A:
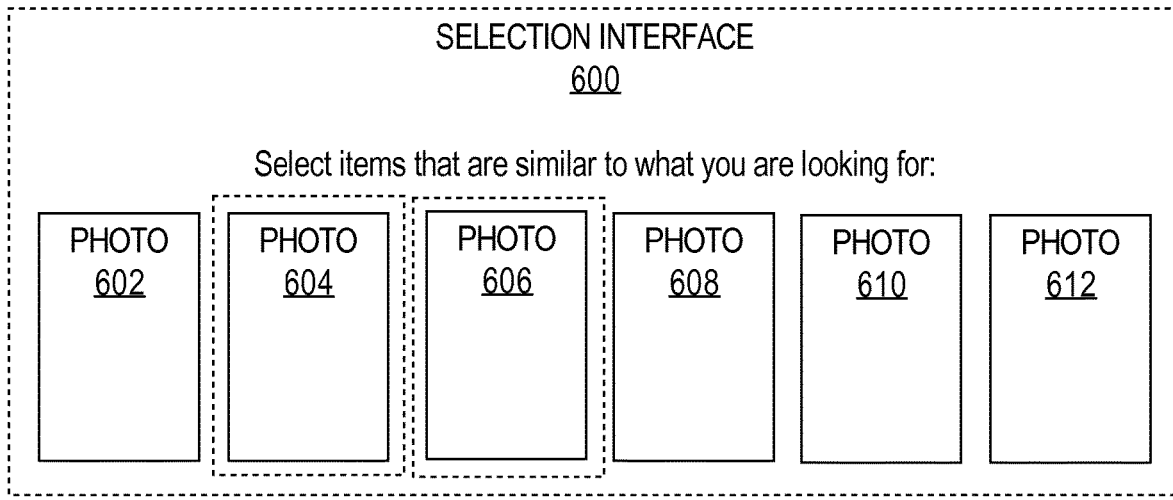
FIG. 6A illustrates an embodiment of a selection interface for selecting at least one exemplar media item.

In one embodiment, a selection of exemplar media items is identified by a user. FIG. 6A illustrates an embodiment of a selection interface for selecting at least one exemplar media item. Items selection interface 600 presents a plurality of digital media items 602-612. In one embodiment, item selection interface 600 allows a user to browse digital media items associated with his account. In one embodiment, specific digital media items are preferentially displayed. Candidates for preferential display include newly uploaded digital media items, digital media items that appear similar to each other based on an initial round of processing, frequently viewed images, images shared with other individuals, and/or images shared via one or more social media outlets.

Figure 6B:
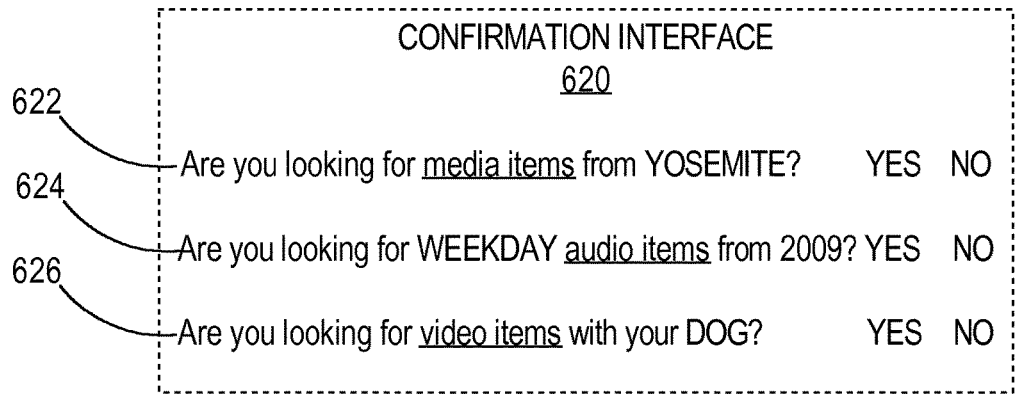
FIG. 6B illustrates an embodiment of a confirmation interface for confirming or rejecting one or more album membership criteria statements.

In one embodiment, after generating one or more album membership criteria based on one or more exemplar media items, a user is asked to confirm and/or edit the personalized album membership criteria. The album membership criteria is modified based on the user input. FIG. 6B illustrates an embodiment of a confirmation interface for confirming or rejecting one or more album membership criteria statements. Confirmation interface 620 displays one or more album membership criteria statements 622-626. Each album membership criteria statement is directed to one or more album membership criterion. User input is obtained that confirms or rejects the album membership criteria statements 622-

626. Although a textual interface is shown, confirmation interface 620 may also be presented as a calendar interface, a map interface, and/or any other graphical interface.

Existing Album as Exemplar Media Item/s

In one embodiment, an existing album is identified as a criteria creation element when specifying one or more exemplar media items. In this case, digital media items contained in or otherwise associated with the existing album are used as the exemplar media items. The selection of a manually constructed album allows for the evaluation of prior user behavior to generate criteria for future automatic media organization. In one embodiment, manually constructed albums are automatically evaluated, and the generated album membership criteria are suggested to the user.

In one embodiment, when the identified album is not associated with any album membership criteria, the newly generated album membership criteria is associated with the album, and future items uploaded to or otherwise added to the library are evaluated for album membership based on the newly generated album membership criteria.

Criteria Expression Chaining

A criteria expression includes at least one album membership criterion coupled with one or more logical operators. In one embodiment, each criteria expression functions as a boolean expression that evaluates to true or false when applied to a particular media item. Each criteria expression may include at least one album membership criteria, coupled with one or more logical operators, such as AND, OR, and NOT. Different sets of logical operators may be implemented in different embodiments. For example, an embodiment can implement any subset of logical operators in a criteria expression, e.g. {AND}, {AND, OR}, {AND, NOT}, {OR, NOT}, or {AND, OR, NOT}. The media item is only associated with the corresponding album if the criteria expression evaluates to true when applied to the media item. Each individual criterion also evaluates to true or false when applied to a particular media item. In one embodiment, a criteria expression is applied to the media item by applying each individual criterion of the criteria expression to the media item and applying the logical operators.

Figure 7A:
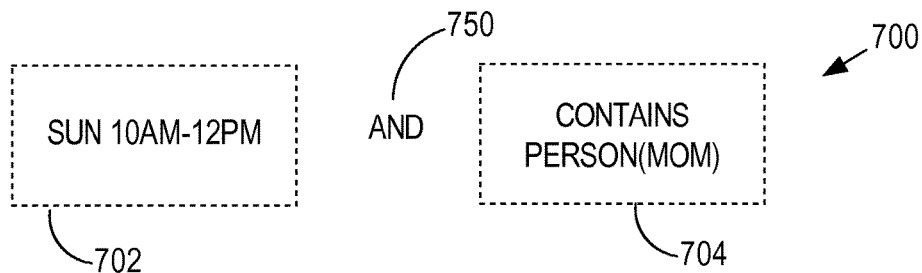
FIGS. 7A-7C illustrate embodiments of criteria expressions.
Figure 7B:
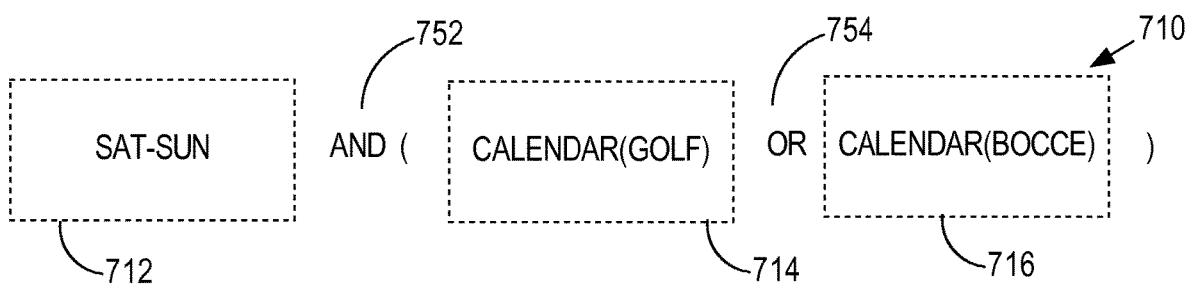
Figure 7C:
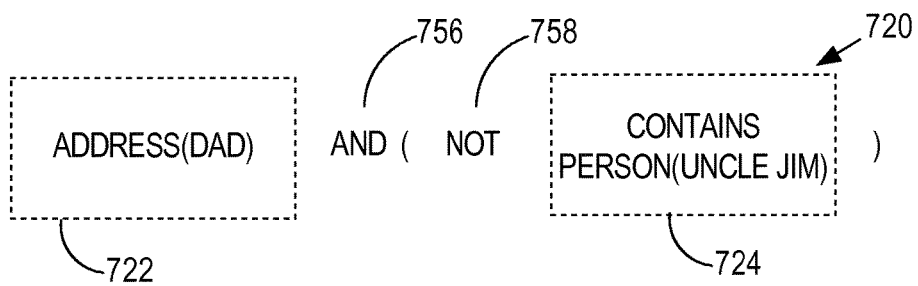

FIGS. 7A-7C illustrate embodiments of criteria expressions. In FIG. 7A, criteria expression 700 includes album membership criterion 702 and album membership criterion 704 coupled with AND operator 750. Album membership criterion 702 is based on a time value, while album membership criterion 704 is based on a person. Only digital media items that include a depiction of "Mom" and are associated with Sundays from 10 AM-12 PM will be associated with an album corresponding to criteria expression 700.

In FIG. 7B, criteria expression 710 includes album membership criterion 714 and album membership criterion 716 coupled with OR operator 754, the result of which is coupled with album membership criterion 712 with AND operator 752. Album membership criteria 712-716 are based on time data. Only digital media items associated with time values specified by calendar events containing the phrase "GOLF" or "BOCCE" that are also on the weekend will be associated with an album corresponding to criteria expression 710.

In FIG. 7C, criteria expression 720 includes album membership criterion 724 coupled with NOT operator 758, the result of which is coupled with album membership criterion 722 with AND operator 756. Album membership criteria 722 is based on location data. Album membership criteria 724 is based on a person. Only digital media items that do not include a depiction of "uncle Jim" and are associated with the location specified by "Dad's" address will be associated with an album corresponding to criteria expression 720.

In one embodiment, a criteria chaining interface is displayed to the user. A criteria chaining interface includes controls that enable a user to generate a criteria expression comprising one or more album membership criteria coupled with one or more logical operators. In one embodiment, the criteria chaining interface allows the user to identify one or more criteria creation elements from which at least one album membership criteria is generated.

Retrieving Media Based on Criteria

In one embodiment, album membership criteria is used as search criteria to search for and/or otherwise retrieve one or more media items, such as audio data, image data, three-dimensional data, video data, and multimedia data. For example, one or more saved album membership criteria may be used to search for and/or otherwise retrieve media that satisfies the album membership criteria in another set of media. Alternatively and/or in addition, search criteria can be specifically generated for the purpose of media searching or otherwise retrieving media. Search criteria may be generated using the methods described herein for generating album membership criteria, including but not limited to album membership criteria generation as described in FIGS. 2-7C, including:

object as a criteria creation element, including annotated objects;

time as a criteria creation element;

location as a criteria creation element;

facial recognition as a criteria creation element;

exemplar media item/s as a criteria creation element; and criteria expressions.

Process for Personalized Criteria-Based Media Organization

Figure 8:
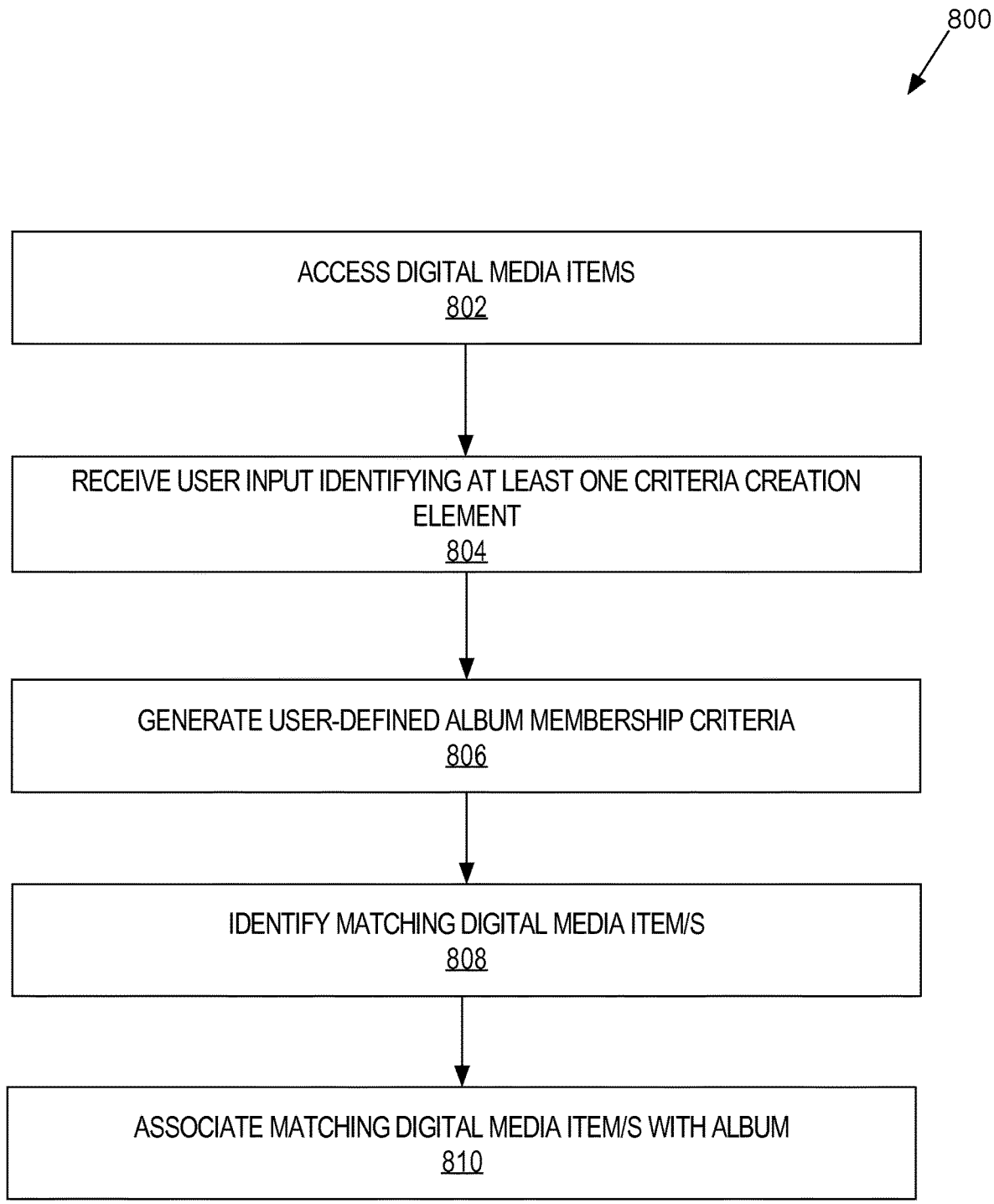
FIG. 8 is a flow diagram that illustrates an embodiment of a process for organizing digital media items into an album.

FIG. 8 is a flow diagram that illustrates an embodiment of a process for organizing digital media items into an album. Process 800 may be performed by one or more computing devices, such as computer system 900. In one embodiment, one or more blocks of process 800 is performed by a media application server configured to organize digital media items into one or more albums, such as media application server 120.

At block 802, digital media items are accessed. The digital media items may include one or more of audio data, image data, three-dimensional data, video data, and multimedia data. In one embodiment, the digital media items are uploaded from a client device. In one embodiment, the digital media items reside on a media application server and/or an associated data store.

At block 804, user input identifying at least one criteria creation element is received for a particular album. Criteria creation elements are used to generate user-defined album membership criteria used to organize the digital media items into one or more albums. In one embodiment, the at least one criteria creation element includes at least one of an object, a person, at least one exemplar media item, time data and location data.

At block 806, user-defined album membership criteria are generated based on the at least one criteria creation element. In one embodiment, the user-defined album membership criteria include at least one of "contains an object," "contains a face associated with a person," "is associated with a time value," "is associated with a location value," "is associated with the specified metadata value," "has a data feature," and/or "has an image feature." The user-identified album membership criteria may be generated based on user input and/or extracted by processing one or more exemplar media items.

At block 808, matching digital media items are identified. A matching digital media item satisfies the user-defined album membership criteria associated with the album. The matching digital media items are identified from the set of digital media items associated with one or more accounts, or a subset thereof.

At block 810, the matching digital media items are associated with the album. In one embodiment, the matching digital media items are stored as files within a folder corresponding to the album. Alternatively, the matching digital media items may be otherwise associated with the album. In one embodiment, a digital media item may be associated with multiple albums.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
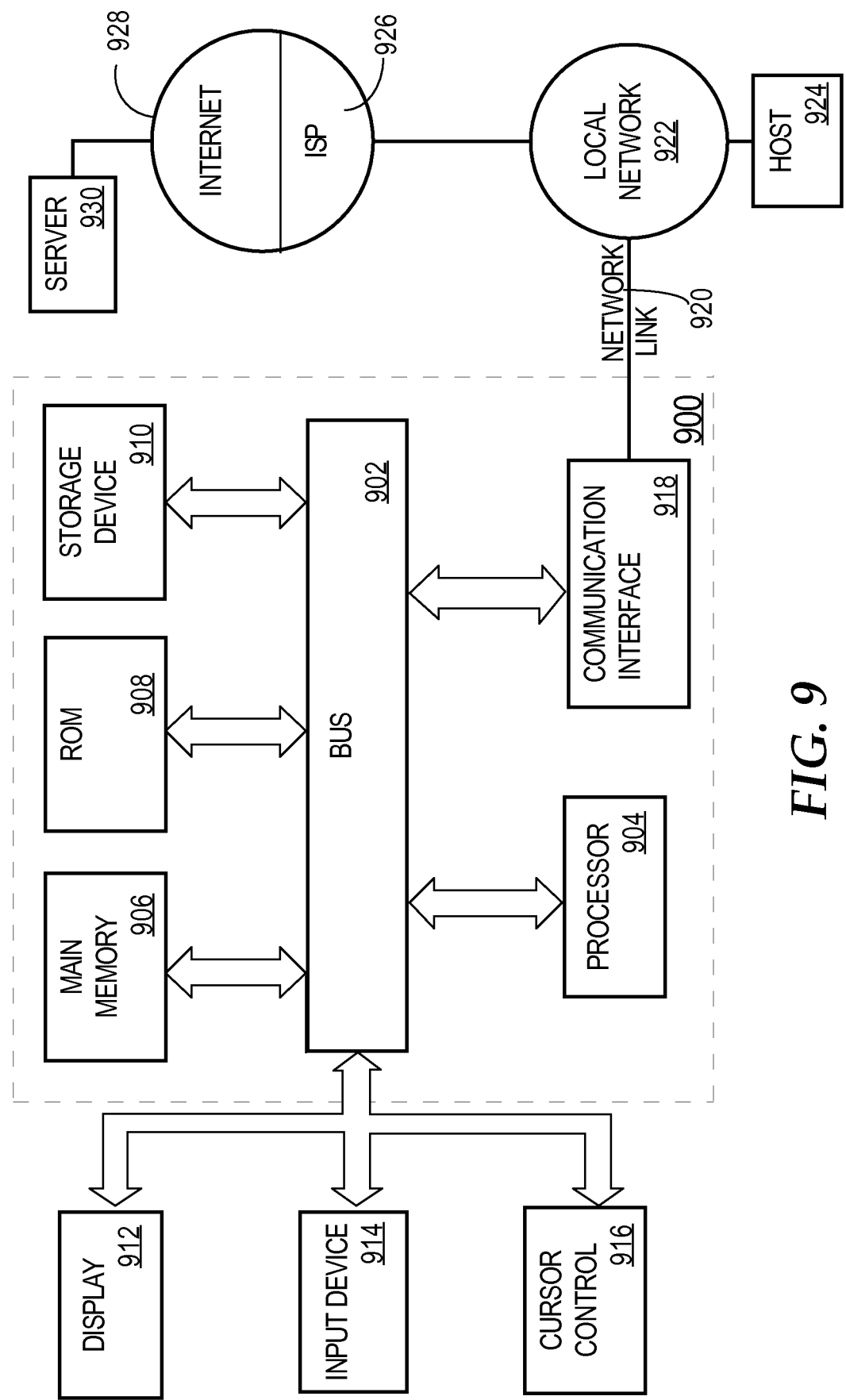
FIG. 9 illustrates a computer system upon which one or more embodiments may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system for media classification, comprising:
at least one processor configured for:
receiving a plurality of images;
organizing the plurality of images into one or more albums, wherein at least one album is associated with album membership criteria and includes only images that satisfy the album membership criteria;
receiving user input identifying a first exemplar image, wherein the first exemplar image has a first region that depicts an object;
receiving user input identifying a first target region of the first exemplar image, wherein the first region is covered by the first target region;
receiving user input identifying a second exemplar image and a second target region of the second exemplar image, wherein the object is depicted in the second target region of the second exemplar image;
identifying a set of one or more features of the object included in both the first target region of the first exemplar image and the second target region of the second exemplar image;
modifying the album membership criteria based on at least one feature from the set of one or more features of the object, the album membership criteria being a Boolean function including one or more Boolean expressions, and wherein modifying includes adding another Boolean expression to the album membership criteria; and
identifying matching images of the plurality of images that satisfy the album membership criteria.

2. The system of claim 1, wherein the one or more features include a color.

3. The system of claim 1, wherein the object is a non-human object.

4. The system of claim 1, wherein the at least one processor is further configured for:
analyzing the first target region of the first exemplar image and the second target region of the second exemplar image to extract one or more features from the first target region of the first exemplar image and the second target region of the second exemplar image.

5. The system of claim 4, wherein the one or more features include a boundary of the object depicted in the first target region and the second target region.

6. A method, implemented on at least one machine each of which having at least one processor, storage, and a communication platform connected to a network for classifying media, the method comprising:
organizing a plurality of images into one or more albums, wherein at least one album is associated with album membership criteria and includes only images that satisfy the album membership criteria;
receiving user input identifying a first exemplar image, wherein the first exemplar image has a first region that depicts an object;
receiving user input identifying a first target region of the first exemplar image, wherein the first region is covered by the first target region;
receiving user input identifying a second exemplar image and a second target region of the second exemplar image, wherein the object is depicted in the second target region of the second exemplar image;
identifying a set of one or more features of the object included in both the first target region of the first exemplar image and the second target region of the second exemplar image;
modifying the album membership criteria based on at least one feature from the set of one or more features of the object, the album membership criteria being a Boolean function including one or more Boolean expressions, and wherein modifying includes adding another Boolean expression to the album membership criteria; and
identifying matching images of the plurality of images that satisfy the album membership criteria.

7. The method of claim 6, wherein the one or more features include a color.

8. The method of claim 6, wherein the object is a non-human object.

9. The method of claim 6, further comprising:
causing display of a suggestion interface comprising a plurality of sets of images, other than the first and second exemplar images, wherein each set of the plurality of sets of images includes images that share a different subset of features from of the set of features of the object; and
receiving user input comprising a selected set of the plurality of sets, wherein modifying the album membership criteria is based on the subset of features corresponding to the selected set.

10. The method of claim 6, wherein the set of one or more features include a feature extracted from the first and second exemplary images by image processing.

11. The method of claim 6, wherein the step of identifying further includes analyzing the first target region of the first exemplar image and the second target region of the second exemplar image to extract one or more features from the first target region of the first exemplar image and the second target region of the second exemplar image.

12. The method of claim 11, wherein the one or more features include a boundary of the object depicted in the first target region and the second target region.

13. The method of claim 6, further comprising:
receiving at least one or more new images; and
identifying any matching images of the at least one or more new images that satisfy the modified album membership criteria.

14. A non-transitory computer-readable medium storing instructions which, when executed by one or more processors, cause the one or more processors to carry out:
organizing a plurality of images into one or more albums, wherein at least one album is associated with album membership criteria and includes only images that satisfy the album membership criteria;
receiving user input identifying a first exemplar image, wherein the first exemplar image has a first region that depicts an object;
receiving user input identifying a first target region of the first exemplar image, wherein the first region is covered by the first target region;
receiving user input identifying a second exemplar image and a second target region of the second exemplar image, wherein the object is depicted in the second target region of the second exemplar image;
identifying a set of one or more features of the object included in both the first target region of the first exemplar image and the second target region of the second exemplar image;
modifying the album membership criteria based on at least one feature from the set of one or more features of the object, the album membership criteria being a Boolean function including one or more Boolean expressions, and wherein modifying includes adding another Boolean expression to the album membership criteria; and
identifying matching images of the plurality of images that satisfy the album membership criteria.

15. The medium of claim 14, wherein a second region of the first exemplar image is not covered by the first target region and wherein the second region is not analyzed.

16. The medium of claim 14, wherein the one or more features include at least one of a boundary of the object depicted in the first target region and the second target region, a geometry of the object, or a color of the object.

17. The system of claim 1, wherein a second region of the first exemplar image is not covered by the first target region, and wherein the second region is not analyzed.

18. The system of claim 4, wherein the one or more features include a geometry of the object depicted in the first target region and the second target region.

19. The medium of claim 14, wherein the object is a non-human object.

20. The system of claim 1, wherein the at least one processor is further configured for receiving user input confirming the modified function corresponding to the album membership criteria.

* * * * *